US012723116B2

(12) United States Patent
Pibre et al.

(10) Patent No.: US 12,723,116 B2
(45) Date of Patent: Sep. 1, 2026

(54) RUBBER COMPOSITION BASED ON A HIGHLY SATURATED DIENE ELASTOMER

(71) Applicant: COMPAGNIE GENERALE DES ETABLISSEMENTS MICHELIN, Clermont-Ferrand (FR)

(72) Inventors: Guillaume Pibre, Clermont-Ferrand (FR); Thomas Ferrand, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 648 days.

(21) Appl. No.: 18/024,556

(22) PCT Filed: Sep. 3, 2021

(86) PCT No.: PCT/FR2021/051516

§ 371 (c)(1),
(2) Date: Mar. 3, 2023

(87) PCT Pub. No.: WO2022/049351

PCT Pub. Date: Mar. 10, 2022

(65) Prior Publication Data

US 2024/0026044 A1 Jan. 25, 2024

(30) Foreign Application Priority Data

Sep. 4, 2020 (FR) ...................................... 2009005

(51) Int. Cl.

| | |
|---|---|
| ***C08F 210/02*** | (2006.01) |
| ***B60C 1/00*** | (2006.01) |
| ***C08F 222/10*** | (2006.01) |
| ***C08F 236/08*** | (2006.01) |
| ***C08K 3/36*** | (2006.01) |
| ***C08K 5/14*** | (2006.01) |
| ***C08K 5/3445*** | (2006.01) |

(52) U.S. Cl.

CPC .......... *C08F 210/02* (2013.01); *B60C 1/0016* (2013.01); *C08F 222/102* (2020.02); *C08F 236/08* (2013.01); *C08K 3/36* (2013.01); *C08K 5/14* (2013.01); *C08K 5/3445* (2013.01); *C08F 2800/10* (2013.01); *C08K 2201/014* (2013.01)

(58) Field of Classification Search

None

See application file for complete search history.

(56) References Cited

U.S. PATENT DOCUMENTS

| | | | |
|---|---|---|---|
| 5,227,425 | A | 7/1993 | Rauline |
| 5,665,812 | A | 9/1997 | Gorce et al. |
| 5,811,479 | A | 9/1998 | Labauze |
| 5,821,290 | A | 10/1998 | Labauze |
| 5,852,099 | A | 12/1998 | Vanel |
| 5,900,449 | A | 5/1999 | Custodero et al. |
| 5,925,713 | A | 7/1999 | Labauze |
| 6,191,205 | B1 | 2/2001 | Micouin et al. |
| 6,204,322 | B1 | 3/2001 | Labauze |
| 6,313,205 | B1 | 11/2001 | Chiron et al. |
| 6,344,506 | B2 | 2/2002 | Vasseur |
| 6,420,488 | B1 | 7/2002 | Penot |
| 6,536,492 | B2 | 3/2003 | Vasseur |
| 6,569,799 | B1 | 5/2003 | Barbotin et al. |
| 6,765,045 | B1 | 7/2004 | Daniel et al. |
| 6,774,255 | B1 | 8/2004 | Tardivat et al. |
| 6,800,705 | B2 | 10/2004 | Barbotin et al. |
| 6,849,754 | B2 | 2/2005 | Deschler et al. |
| 6,916,884 | B2 | 7/2005 | Destarac |
| 7,094,854 | B2 | 8/2006 | Monteil et al. |
| 7,199,175 | B2 | 4/2007 | Vasseur |
| 7,217,751 | B2 | 5/2007 | Durel et al. |
| 7,250,463 | B2 | 7/2007 | Durel et al. |
| 7,488,768 | B2 | 2/2009 | Tardivat et al. |
| 7,900,667 | B2 | 3/2011 | Vasseur |
| 8,071,700 | B2 | 12/2011 | Thuilliez et al. |

(Continued)

FOREIGN PATENT DOCUMENTS

| | | |
|---|---|---|
| EP | 0501227 A1 | 9/1992 |
| EP | 0692492 A1 | 1/1996 |

(Continued)

OTHER PUBLICATIONS

International Search Report dated Nov. 18, 2021, in corresponding PCT/FR2021/051516 (5 pages). S. Brunauer, et al., "Adsorption of Gases in Multimolecular Layers", J. Am. Chem. Soc., vol. 60, pp. 309-319 (1938).

M.F. Llauro, et al., "Investigation of Ethylene/Butadiene Copolymers Microstructure by 1H and 13C NMR", Macromolecules 2001, 34, 6304-6311.

I.G. Zenkevich, et al., "Identification of Alkylarene Chloromethylation Products Using Gas-Chromatographic Retention Indices", Russian Journal of General Chemistry, 2007, vol. 77, No. 4, pp. 611-619.

A.P. Yakubov, et al., "Synthesis of Sterically Hindered Aromatic Aldehydes", Bulletin of the Academy of Sciences of the USSR, Division of Chemical Science (English translation), vol. 40, No. 7.2, pp. 1427-1432 (1991).

*Primary Examiner* — Jeffrey D Washville

(74) *Attorney, Agent, or Firm* — VENABLE LLP

(57) ABSTRACT

A rubber composition is based on at least an elastomer matrix comprising more than 50 phr of a copolymer containing ethylene units and 1,3-diene units, the ethylene units in the copolymer representing more than 50 mol % of the monomer units of the copolymer; a 1,3-dipolar compound corresponding to the formula "Q-Sp-B" in which Q comprises a dipole containing at least and preferably one nitrogen atom, Sp, which is preferably divalent, is an atom or a group of atoms connecting Q to B, and B comprises a specific imidazole ring; a filler comprising predominantly silica and a crosslinking system comprising at least one radical polymerization initiator, and a co-crosslinking agent selected from the group consisting of (meth)acrylate compounds, maleimide compounds, allyl compounds, vinyl compounds and mixtures thereof.

14 Claims, No Drawings

(56) References Cited

U.S. PATENT DOCUMENTS 8,071,800 B2 12/2011 Thuilliez et al.
8,268,949 B2 9/2012 Thuilliez et al.
8,492,475 B2 7/2013 Araujo Da Silva et al.
8,492,573 B2 7/2013 Thuilliez et al.
8,957,155 B2 2/2015 Seeboth et al.
9,010,393 B2 4/2015 Araujo Da Silva et al.
9,394,380 B2 7/2016 Araujo Da Silva et al.
10,752,712 B2 8/2020 Lafaquiere et al.
10,934,377 B2 3/2021 Lafaquiere et al.
11,241,370 B2 2/2022 Valero et al.
11,254,804 B2 2/2022 Gornard et al.
2001/0034389 A1 10/2001 Vasseur
2001/0056138 A1 12/2001 Vasseur
2003/0004287 A1 1/2003 Barbotin et al.
2003/0187165 A1 10/2003 Destarac
2003/0212185 A1 11/2003 Vasseur
2004/0051210 A1 3/2004 Tardivat et al.
2004/0132880 A1 7/2004 Durel et al.
2004/0229999 A1* 11/2004 Achten .................... C08K 5/50
525/227
2005/0004297 A1 1/2005 Durel et al.
2005/0032965 A1 2/2005 Valero
2005/0239639 A1 10/2005 Monteil et al.
2007/0112120 A1 5/2007 Vasseur
2009/0182104 A1 7/2009 Thuilliez et al.
2009/0186961 A1 7/2009 Araujo Da Silva et al.
2009/0209709 A1 8/2009 Araujo Da Silva et al.
2009/0234066 A1 9/2009 Araujo Da Silva et al.
2010/0022725 A1 1/2010 Thuilliez et al.
2010/0145089 A1 6/2010 Mignani et al.
2010/0221541 A1 9/2010 Valero et al.
2011/0152458 A1 6/2011 Araujo Da Silva et al.
2011/0263784 A1 10/2011 Valero et al.
2011/0294953 A1 12/2011 Seeboth et al.
2012/0142905 A1 6/2012 Thuilliez et al.
2012/0165492 A1 6/2012 Thuilliez et al.
2013/0131279 A1 5/2013 Araujo Da Silva et al.
2017/0158782 A1 6/2017 Fleury et al.
2017/0174794 A1 6/2017 Fleury et al.
2018/0346617 A1 12/2018 Fleury et al.
2018/0355083 A1 12/2018 Lafaquiere et al.
2019/0233566 A1 8/2019 Lafaquiere et al.
2019/0263954 A1 8/2019 Lafaquiere et al.
2020/0040166 A1 2/2020 Gornard et al.
2021/0130578 A1 5/2021 Gornard et al.
2021/0332168 A1 10/2021 Pibre et al.
2021/0347205 A1 11/2021 Pibre et al.
2021/0403627 A1* 12/2021 Moreso ................. C08F 236/06
2023/0391994 A1 12/2023 Pibre et al.

FOREIGN PATENT DOCUMENTS

EP 0692493 A1 1/1996
EP 0735088 A1 10/1996
EP 0767206 A1 4/1997
EP 0786493 A1 7/1997
EP 0810258 A1 12/1997
EP 0881252 A1 12/1998
EP 1092731 4/2001
EP 3172241 A1 5/2017
FR 2899808 A1 10/2007
FR 3063732 A1 9/2018
JP 2017-522422 A 8/2017
WO 97/36724 A2 10/1997
WO 99/02590 A1 1/1999
WO 99/02601 A1 1/1999
WO 99/02602 A1 1/1999
WO 99/06480 A1 2/1999
WO 99/09036 A1 2/1999
WO 99/16600 A1 4/1999
WO 00/05300 A1 2/2000
WO 00/05301 2/2000
WO 02/10269 A2 2/2002
WO 02/22688 A2 3/2002
WO 02/30939 A1 4/2002
WO 02/31041 A1 4/2002
WO 02/083782 10/2002
WO 03/016215 2/2003
WO 03/016387 2/2003
WO 2004/035639 4/2004
WO 2006/023815 A2 3/2006
WO 2006/125532 A1 11/2006
WO 2006/125533 A1 11/2006
WO 2006/125534 A1 11/2006
WO 2007/054223 5/2007
WO 2007/054224 5/2007
WO 2007/061550 A1 5/2007
WO 2007/098080 A2 8/2007
WO 2008/055986 A2 5/2008
WO 2010/072685 A1 7/2010
WO 2012/007441 A1 1/2012
WO 2017/093654 6/2017
WO 2018/020122 2/2018
WO 2018/020123 2/2018
WO 2018/162854 A1 9/2018
WO 2020/038762 A1 2/2020
WO 2020/094993 A1 5/2020

* cited by examiner

RUBBER COMPOSITION BASED ON A HIGHLY SATURATED DIENE ELASTOMER

BACKGROUND

The field of the present invention is that of diene rubber compositions which are reinforced by an inorganic filler such as silica and which can be used in particular in the manufacture of tyres for vehicles. It relates more particularly to the treads of pneumatic or non-pneumatic tyres having an improved compromise of rolling resistance/wear.

Since fuel economy and the need to protect the environment have become a priority, it is desirable to produce mixtures having good wear resistance properties while having a hysteresis which is as low as possible in order to be able to process them in the form of rubber compositions which can be used in the manufacture of various semi-finished products involved, for example, in the composition of pneumatic or non-pneumatic tyres, for example treads.

To reduce the rolling resistance, it is known to use diene rubber compositions which are reinforced by an inorganic filler, such as silica. Diene rubber compositions reinforced with an inorganic filler generally comprise a silane as coupling agent, such as a polysulfide or a blocked mercaptosilane, which is a silane bearing a protected thiol function. The silane makes it possible to create interactions between the diene elastomer and the inorganic filler and to promote the dispersion of the inorganic filler in the rubber composition.

Furthermore, in order to obtain the optimum reinforcing properties conferred by a filler in a rubber composition, and thus high wear resistance, it is known to be generally advisable for this filler to be present in the elastomer matrix in a final form that is both as finely divided as possible and as homogeneously distributed as possible. However, such conditions can only be achieved is this filler has a very good ability, on the one hand, to be incorporated in the matrix during the mixing with the elastomer and to deagglomerate and, on the other hand, to disperse homogeneously in this matrix. As is well known, carbon black has such abilities. On the other hand, this is generally not the case with inorganic fillers, in particular silicas. This is because, for reciprocal affinity reasons, these inorganic filler particles tend to clump together in the elastomer matrix. These interactions have the negative consequence of limiting the dispersion of the filler and thus the reinforcing properties to a level substantially lower than that which it would be theoretically possible to achieve if all the (inorganic filler/elastomer) bonds capable of being created during the compounding operation were actually obtained. These interactions moreover tend to increase the consistency in the uncured state of the rubber compositions and thus to make their processability more difficult than in the presence of carbon black.

It therefore remains difficult to develop compositions, filled with silica as filler, which have both excellent rolling resistance and good wear resistance.

It has been possible to improve this performance compromise by virtue of the use, in tyre treads, of novel rubber compositions reinforced with inorganic fillers, in particular specific silicas of the highly dispersible type, which are capable of rivalling, from a reinforcement perspective, a conventional tyre-grade carbon black, while affording these compositions a lower hysteresis, which is synonymous with a lower rolling resistance for the tyres comprising them. Treads filled with such highly dispersible silicas (denoted “HD” or “HDS” for “highly dispersible” or “highly dispersible silica”), which can be used in low rolling resistance tyres sometimes termed “green tyres” in reference to the energy saving afforded to the user (“green tyre concept”), have been widely described. Reference will be made in particular to patent applications EP 501 227, EP 692 492, EP 692 493, EP 735 088, EP 767 206, EP 786 493, EP 881 252, WO 99/02590, WO 99/02601, WO 99/02602, WO 99/06480, WO 00/05300, WO 000/05301. These prior art documents teach the use of HD silicas having a BET specific surface area of between 100 and 250 $m^2/g$. In practice, one HD silica with a high specific surface area listed in the field of “green tyres” is in particular the Zeosil 1165 MP silica (BET surface area equal to around 160 $m^2/g$) sold by Solvay. The use of this Zeosil 1165 MP silica makes it possible to obtain good compromises in terms of tyre performance, in particular satisfactory wear resistance and rolling resistance.

However, there is still a need to further improve the performance compromise between the wear resistance and the rolling resistance.

SUMMARY

Continuing its research, the applicant has unexpectedly discovered that the combined use of a highly saturated diene elastomer, of a specific 1,3-dipolar compound and of a specific radical crosslinking system makes it possible to further improve the abovementioned performance compromise, in compositions filled with silica.

Thus, one subject of the invention is a rubber composition based on at least:

- an elastomer matrix comprising more than 50 phr of a copolymer containing ethylene units and 1,3-diene units, the ethylene units in the copolymer representing more than 50 mol % of the monomer units of the copolymer,
- a 1,3-dipolar compound corresponding to the formula (I)

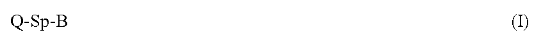

Q-Sp-B (I)

in which:

- Q comprises a dipole containing at least and preferably one nitrogen atom,
- Sp, which is preferably divalent, is an atom or a group of atoms connecting Q to B,
- B comprises an imidazole ring corresponding to the following formula (II):

(II)

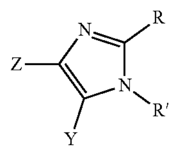

in which:

- three of the four symbols Z, Y, R and R', which are identical or different, each represent an atom or a group of atoms, it being possible for Z and Y to form, together with the carbon atoms to which they are attached, a ring,
- and the fourth symbol Z, Y, R or R' denotes a direct attachment to Sp,
- a filler comprising predominantly silica,
- a crosslinking system comprising at least one radical polymerization initiator, and a co-crosslinking agent selected from the group consisting of (meth)acrylate compounds, maleimide compounds, allyl compounds, vinyl compounds and mixtures thereof.

Another subject of the present invention is a rubber article comprising a composition according to the invention, in particular a tread of a pneumatic or non-pneumatic tyre.

DETAILED DESCRIPTION

I—DEFINITIONS

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

For the purposes of the present invention, the expression "part by weight per hundred parts by weight of elastomer" (or phr) should be understood as meaning the part by mass per hundred parts by mass of elastomer.

In the present document, unless expressly indicated otherwise, all the percentages (%) indicated are percentages (%) by weight.

Furthermore, any interval of values denoted by the expression "between a and b" represents the range of values extending from more than a to less than b (i.e. limits a and b excluded), whereas any interval of values denoted by the expression "from a to b" means the range of values extending from a up to b (i.e. including the strict limits a and b). In the present document, when an interval of values is denoted by the expression "from a to b", the interval represented by the expression "between a and b" is also, and preferentially, denoted.

When reference is made to a "predominant" compound, this is understood to mean, for the purposes of the present invention, that this compound is predominant among the compounds of the same type in the composition, that is to say that it is that which represents the greatest amount by weight among the compounds of the same type. Thus, for example, a predominant elastomer is the elastomer representing the greatest weight relative to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. By contrast, a "minor" compound is a compound which does not represent the greatest fraction by weight among the compounds of the same type. Preferably, the term "predominant" is understood to mean present at more than 50%, preferably more than 60%, 70%, 80%, 90%, and more preferentially the "predominant" compound represents 100%.

In the present application, the expression "all of the monomer units of the copolymer" or "the total amount of the monomer units of the copolymer" means all the constituent repeating units of the copolymer which result from the insertion of the monomers into the elastomer chain by polymerization. Unless otherwise indicated, the contents of a monomer unit or repeating unit in the copolymer containing ethylene units and 1,3-diene units are given in molar percentage calculated on the basis of all of the monomer units of the copolymer.

The carbon-comprising compounds mentioned in the description can be of fossil or biobased origin. In the latter case, they can, partially or completely, result from biomass or be obtained from renewable starting materials resulting from biomass. This relates in particular to polymers, plasticizers, fillers, etc.

All the values for glass transition temperature "Tg" described in the present document are measured in a known manner by DSC (Differential Scanning calorimetry) according to Standard ASTM D3418 (1999).

II—DESCRIPTION OF THE INVENTION

II-1 Elastomer Matrix

The composition of the tyre according to the invention has the essential feature of comprising an elastomer matrix comprising more than 50 phr of a copolymer containing ethylene units and 1,3-diene units, the ethylene units in the copolymer representing more than 50 mol % of the monomer units of the copolymer.

In the present document, the "copolymer containing ethylene units and 1,3-diene units, the ethylene units in the copolymer representing more than 50 mol % of the monomer units of the copolymer" may be denoted with "copolymer" or with "copolymer containing ethylene units and 1,3-diene units" for the sake of simplicity of wording.

The term "elastomer matrix" is intended to mean all the elastomers of the composition.

The term "copolymer containing ethylene units and 1,3-diene units" is intended to mean any copolymer comprising, within its structure, at least ethylene units and ,3-diene units. The copolymer can thus comprise monomer units other than ethylene units and ,3-diene units. For example, the copolymer can also comprise alpha-olefin units, in particular alpha-olefin units having from 3 to 18 carbon atoms, advantageously having from 3 to 6 carbon atoms. For example, the alpha-olefin units can be selected from the group consisting of propylene, butene, pentene, hexene or mixtures thereof.

In a known manner, the expression "ethylene unit" refers to the $-(CH_2-CH_2)-$ unit resulting from the insertion of ethylene into the elastomer chain.

In a known manner, the expression "1,3-diene unit" refers to the units resulting from the insertion of 1,3-diene via a 1,4 addition, a 1,2 addition or a 3,4 addition in the case of isoprene. The 1,3-diene units are those, for example, of a 1,3-diene or of a mixture of 1,3-dienes, the 1,3-diene(s) having from 4 to 12 carbon atoms, such as very particularly 1,3-butadiene and isoprene. Preferably, the 1,3-diene is 1,3-butadiene.

Advantageously, the ethylene units in the copolymer represent between 50 mol % and 95 mol %, preferably between 55 mol % and 90 mol % of the monomer units of the 30 copolymer.

Advantageously, the copolymer containing ethylene units and 1,3-diene units is a copolymer of ethylene and of 1,3-diene, that is to say that the copolymer does not contain any units other than ethylene and 1,3-diene.

When the copolymer is a copolymer of ethylene and of a 1,3-diene, said copolymer advantageously contains units of formula (III) and/or (IV). The presence of a saturated 6-membered cyclic unit, 1,2-cyclohexanediyl, of formula (III) as a monomer unit in the copolymer can result from a series of very particular insertions of ethylene and of 1,3-butadiene in the polymer chain during its growth.

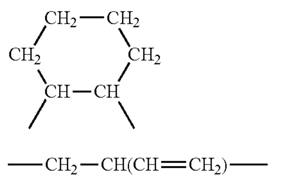

(III)

$$—CH_2—CH(CH{=}CH_2)— \quad (IV)$$

For example, the copolymer of ethylene and of a 1,3-diene can be devoid of units of formula (III). In this case, it preferably contains units of formula (IV).

When the copolymer of ethylene and of a 1,3-diene comprises units of formula (III) or units of formula (IV) or else units of formula (III) and units of formula (IV), the molar percentages of the units of formula (III) and of the units of formula (IV) in the copolymer, respectively o and p, preferably satisfy the following equation (eq. 1), more preferentially satisfy the equation (eq. 2), o and p being calculated on the basis of all the monomer units of the copolymer.

$$0<o+p\leq 25 \quad \text{(eq. 1)}$$

$$0<o+p\leq 20 \quad \text{(eq. 2)}$$

According to the invention, the copolymer, preferably the copolymer of ethylene and of a 1,3-diene (preferably of 1,3-butadiene), is a random copolymer.

Advantageously, the number-average mass (Mn) of the copolymer, preferably of the copolymer of ethylene and of a 1,3-diene (preferably of 1,3-butadiene), is within a range extending from 100 000 to 300 000 g/mol, preferably from 150 000 to 250 000 g/mol.

The Mn of the copolymer is determined in a known manner by size exclusion chromatography (SEC) as described below:

The SEC (Size Exclusion Chromatography) technique makes it possible to separate macromolecules in solution according to their size through columns filled with a porous gel. The macromolecules are separated according to their hydrodynamic volume, the bulkiest being eluted first. While it is not an absolute method, SEC gives a picture of the molar mass distribution of a polymer. The various number-average molar masses (Mn) and weight-average molar masses (Mw) can be determined from commercial standards and the polydispersity index (PI=Mw/Mn) can be calculated via a "Moore" calibration. The polymer sample does not undergo any particular treatment before analysis. The latter is simply dissolved in the elution solvent at a concentration of approximately 1 $g \cdot l^{-1}$. The solution is then filtered through a filter with a porosity of 0.45 μm before injection. The apparatus used is a Waters Acquity or Waters Alliance chromatographic line. The elution solvent is tetrahydrofuran with 250 ppm of BHT (butylated hydroxytoluene) antioxidant, the flow rate is 1 $ml \cdot min^{-1}$, the temperature of the columns is 35° C. and the analysis time is 40 min. The columns used are a set of three Agilent columns having the trade name InfinityLab PolyPore. The volume of the solution of the sample injected is 100 μl. The detector is an Acquity or Waters 2410 differential refractometer and the software for processing the chromatographic data is the Waters Empower system. The calculated average molar masses are relative to a calibration curve produced with polystyrene standards.

The copolymer can be obtained according to various synthesis methods known to those skilled in the art, notably based on the targeted microstructure of the copolymer. Generally, it may be prepared by copolymerization at least of a 1,3-diene, preferably 1,3-butadiene, and of ethylene and according to known synthesis methods, in particular in the presence of a catalytic system comprising a metallocene complex. Mention may be made in this respect of catalytic systems based on metallocene complexes, which catalytic systems are described in documents EP 1 092 731, WO 2004035639, WO 2007054223 and WO 2007054224 in the name of the applicant. The copolymer, including the case when it is random, may also be prepared via a process using a catalytic system of preformed type such as those described in documents WO 2017093654 A1, WO 2018020122 A1 and WO 2018020123 A1.

The copolymer may consist of a mixture of copolymers containing ethylene units and diene units which differ from each other by virtue of their microstructures and/or their macrostructures.

Advantageously, the content of the copolymer containing ethylene units and 1,3-diene units in the composition is within a range extending from 60 to 100 phr, preferably from 80 to 100 phr.

The elastomer matrix may advantageously solely comprise, as elastomer, the copolymer containing ethylene units and 1,3-diene units.

Alternatively, the elastomer matrix may also comprise a diene elastomer other than the copolymer containing ethylene units and 1,3-diene units (also referred to herein as "the other elastomer"). The other elastomer, when it is present, is minor, that is to say that it represents less than 50%, 40%, 30%, 20% or even less than 10% by weight of the elastomer matrix. For example, the content of the other elastomer in the composition can be within a range extending from 0 to 40 phr, preferably from 0 to 20 phr.

The other elastomer of the elastomer matrix of the tyre according to the invention is preferentially selected from the group of highly unsaturated diene elastomers such as polybutadienes (abbreviated to "BRs"), synthetic polyisoprenes (IRs), natural rubber (NR), butadiene copolymers, isoprene copolymers and mixtures of these elastomers. "Highly unsaturated diene elastomer" is generally understood to mean a diene elastomer resulting at least in part from conjugated diene monomers having a content of units of diene origin (conjugated dienes) which is greater than 50% (mol %).

II-2 1,3-Dipolar Compound

The rubber composition in accordance with the invention comprises a 1,3-dipolar compound. The term "1,3-dipolar compound" is understood according to the definition given by the IUPAC.

The 1,3-dipolar compound corresponds to the formula (I):

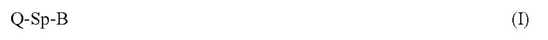

$$Q\text{-}Sp\text{-}B \quad (I)$$

in which:

- Q comprises a dipole containing at least and preferably one nitrogen atom,
- Sp, which is preferably divalent, is an atom or a group of atoms connecting Q to B,
- B comprises an imidazole ring corresponding to the formula (II):

(II)

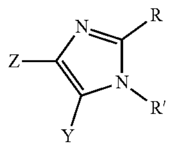

in which:

three of the four symbols Z, Y, R and R', which are identical or different, each represent an atom or a group of atoms, it being possible for Z and Y to form, together with the carbon atoms to which they are attached, a ring (of course, when neither Z nor Y denote the $4^{th}$ symbol), and just the fourth symbol denotes a direct attachment to Sp.

According to a first alternative form of the invention, R denotes a direct attachment to Sp, in which case R is the $4^{th}$ symbol.

According to this alternative form, R' can be a hydrogen atom or a carbon-based group which can contain at least one heteroatom.

According to a preferential embodiment of this alternative form, R' represents a carbon-based group containing from 1 to 20 carbon atoms, preferably an aliphatic group, more preferentially an alkyl group which preferably contains from 1 to 12 carbon atoms.

According to a second alternative form of the invention, R' denotes a direct attachment to Sp, in which case R' is the $4^{th}$ symbol.

According to the first or the second alternative form, Z and Y can each be a hydrogen atom.

According to the first alternative form or the second alternative form, Z and Y can form, together with the carbon atoms to which they are attached, a ring. The ring formed by Z, Y and the atoms to which Z and Y are attached may or may not be substituted and can comprise at least one heteroatom. Z and Y can form, with the two carbon atoms to which they are attached, an aromatic ring. In this case, the imidazole ring can be a substituted or unsubstituted benzimidazole.

According to a third alternative form of the invention, of course when Y and Z do not form, together with the carbon atoms to which they are attached, a ring, Y or Z denotes a direct attachment to Sp, in which case Y or Z is the $4^{th}$ symbol.

According to the second or third alternative form of the invention, R advantageously represents a hydrogen atom or a carbon-based group which can contain at least one heteroatom. In this case, R can be a group of 1 to 20 carbon atoms, preferably an aliphatic group, more preferentially an alkyl group preferably containing from 1 to 12 carbon atoms, more preferentially still a methyl.

Advantageously, Sp is divalent.

Sp may be a group containing up to 20 carbon atoms, which group may contain at least one heteroatom. Sp may be an aliphatic or aromatic group.

When Sp is an aliphatic group, Sp preferentially contains from 1 to 20 carbon atoms, more preferentially from 1 to 12 carbon atoms, more preferentially still from 1 to 6 carbon atoms and very particularly from 1 to 3 carbon atoms. When Sp is an aromatic group, Sp preferentially contains from 6 to 20 carbon atoms, more preferentially from 6 to 12 carbon atoms.

Advantageously, Sp is a divalent group selected from alkylene groups containing from 1 to 20 carbon atoms, preferentially from 1 to 12 carbon atoms, more preferentially from 1 to 6 carbon atoms and more preferentially still from 1 to 3 carbon atoms. More preferably still, Sp O is a divalent group containing from 1 to 3 carbon atoms, preferably the methylene group.

An arylene group preferably containing from 6 to 20 carbon atoms, more preferentially from 6 to 12 carbon atoms, may also be suitable as divalent group Sp.

The compounds selected from the group consisting of nitrile oxides, nitrile imines and nitrones, in which case Q contains a —C≡N→O, —C≡N→N— or —C≡N(→O)— unit, are very particularly suitable as 1,3-dipolar compounds.

When Q comprises a —C≡N→O unit, Q preferably comprises, more preferentially represents, the unit corresponding to formula (V):

(V)

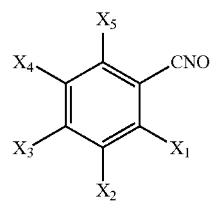

in which four of the five symbols $X_1$ to $X_5$, which are identical or different, are each an atom or a group of atoms, and the fifth symbol denotes a direct attachment to Sp, it being known that $X_1$ and $X_5$ are both other than H. The four of the five symbols $X_1$ to $X_5$ may be aliphatic or aromatic groups. The aliphatic groups can contain from 1 to 20 carbon atoms, preferentially from 1 to 12 carbon atoms, more preferentially from 1 to 6 carbon atoms, and more preferentially still from 1 to 3 carbon atoms. The aromatic groups can contain from 6 to 20 carbon atoms and preferentially from 6 to 12 carbon atoms.

$X_1$, $X_3$ and $X_5$ are preferentially each an alkyl group of 1 to 6 carbon atoms, more preferentially of 1 to 3 carbon atoms and more preferentially still a methyl or ethyl group.

Advantageously, $X_1$, $X_3$ and $X_5$ are identical. In addition, $X_1$, $X_3$ and $X_5$ are preferentially each an alkyl group of 1 to 6 carbon atoms, more preferentially of 1 to 3 carbon atoms and more preferentially still a methyl or ethyl group.

Particularly advantageously, the 1,3-dipolar compound is the compound 2,4,6-trimethyl-34(2-methyl-1H-imidazol-1-yl)methyl)benzonitrile oxide, corresponding to the formula (Va), or the compound 2,4,6-triethyl-3-((2-methyl-1H-imidazol-1-yl)methyl)benzonitrile oxide, corresponding to the formula (Vb):

(Va)

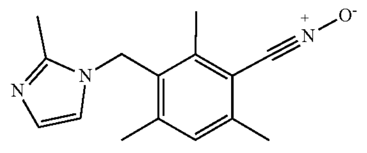

-continued (Vb)

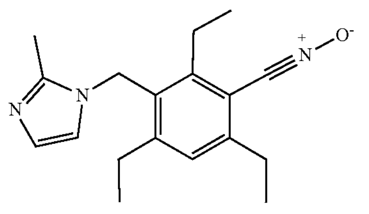

When Q comprises a —C═N(→O)— unit, Q can comprise the unit corresponding to formula (VI) or (VII):

(VI)

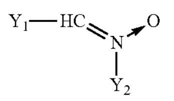

(VII)

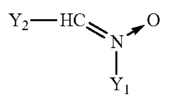

in which:

- $Y_1$ is an aliphatic group, preferentially an alkyl group preferably containing from 1 to 12 carbon atoms, or an aromatic group containing from 6 to 20 carbon atoms, preferentially an alkylaryl group, more preferentially a phenyl or tolyl group, and
- $Y_2$, comprising a direct attachment to Sp, is an aliphatic group, preferentially an alkylene group preferably containing from 1 to 12 carbon atoms, or an aromatic group preferentially containing from 6 to 20 carbon atoms and comprising, on its benzene ring, the direct attachment to Sp.

In this case, the direct attachment of the benzene ring of $Y_2$ to Sp amounts to saying that Sp is a substituent of the benzene ring of $Y_2$.

When Q comprises a —C═N(→O)— unit, the 1,3-dipolar compound can be the compound of formula (VIa), (VIb), (VIIa) or (VIIb):

(VIa)

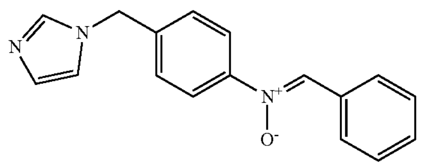

(VIb)

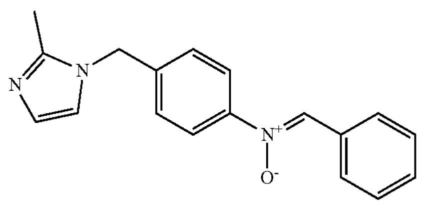

(VIIa)

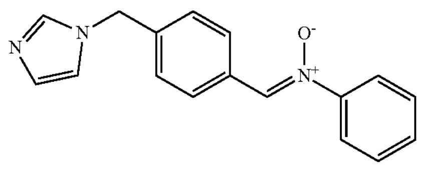

-continued (VIIb)

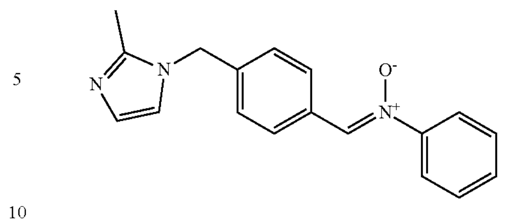

1,3-Dipolar compounds corresponding to the formula (I) can be readily synthesized following a synthesis process described in paragraph IV-2 below.

The amount of 1,3-dipolar compound introduced into the rubber composition is expressed as molar equivalent of imidazole ring. For example, if the 1,3-dipolar compound contains just one imidazole ring of formula (II) as defined above, one mole of imidazole ring corresponds to one mole of 1,3-dipolar compound. If the 1,3-dipolar compound contains two imidazole rings of formula (II) as defined above, two moles of imidazole ring correspond to one mole of 1,3-dipolar compound. In the latter case, the use of the 1,3-dipolar compound according to one molar equivalent of imidazole ring corresponds to a half-mole of 1,3-dipolar compound.

According to the invention, the amount of 1,3-dipolar compound in the composition can be between 0 and 50, preferably between 0.01 and 15, molar equivalents per 100 mol of monomer units constituting the copolymer. For example, it may be between 4 and 15 molar equivalents, for example between 5 and 15 molar equivalents. However, preferentially, the amount of 1,3-dipolar compound in the composition is preferentially between 0 and 3 molar equivalents, more preferentially between 0 and 2 molar equivalents, more preferentially still between 0 and 1 molar equivalent, indeed even more preferentially still between 0 and 0.7 molar equivalents, of imidazole ring per 100 mol of monomer units constituting the copolymer. These preferential ranges make it possible to more finely optimize the compromise between the stiffness in the cured state and the hysteresis of the rubber composition according to its application, in particular in a tyre. More preferably still, the amount of 1,3-dipolar compound in the composition is preferentially between 0.1 and 3 molar equivalents, more preferentially between 0.1 and 2 molar equivalents, more preferentially still between 0.1 and 1 molar equivalents, indeed even more preferentially still between 0.1 and 0.7 molar equivalents, of imidazole ring per 100 mol of monomer units constituting the copolymer.

II-3 Filler

The composition according to the invention also has the essential feature of being based on a filler comprising predominantly silica.

The silica used in the composition according to the invention can be any silica known to those skilled in the art, in particular any precipitated or fumed silica having a BET specific surface area and a CTAB specific surface area which are both less than 450 $m^2/g$, preferably from 30 to 400 $m^2/g$, in particular from 60 to 300 $m^2/g$. The silica advantageously has a BET specific surface area within a range extending from 125 to 200 $m^2/g$ and/or a CTAB specific surface area within a range extending from 140 to 170 $m^2/g$.

The BET specific surface area of the silica is determined by gas adsorption using the Brunauer-Emmett-Teller method described in "The Journal of the American Chemical Society" (Vol. 60, page 309, February 1938), and more specifically according to a method adapted from Standard NF ISO 5794-1, Appendix E, of June 2010 [multipoint (5 point) volumetric method—gas: nitrogen—degassing under vacuum: one hour at 160° C.—relative pressure $p/p_0$ range: 0.05 to 0.17].

The CTAB specific surface area values of the silica were determined according to Standard NF ISO 5794-1, Appendix G of June 2010. The process is based on the adsorption of CTAB (N-hexadecyl-N,N,N-trimethylammonium bromide) on the "external" surface of the filler.

Any type of precipitated silica, in particular highly dispersible precipitated silicas (referred to as "HDS" for "highly dispersible" or "highly dispersible silica"), may be used. These precipitated silicas, which may or may not be highly dispersible, are well known to those skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silicas, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

Advantageously, the filler comprises more than 70% by weight, preferably more than 80% by weight, of silica.

Preferably, the content of silica is within a range extending from 5 to 60 phr, preferably from 10 to 55 phr and more preferably from 15 to 50 phr.

In order to couple the silica to the copolymer, use may be made, in a well-known manner, of an at least bifunctional coupling agent (or bonding agent) intended to provide a satisfactory connection, of chemical and/or physical nature, between the silica (surface of its particles) and the copolymer (hereinafter simply referred to as "coupling agent"). Use is made in particular of organosilanes or polyorganosiloxanes that are at least bifunctional. The term "bifunctional" is understood to mean a compound having a first functional group capable of interacting with the inorganic filler and a second functional group capable of interacting with the copolymer. For example, such a bifunctional compound can comprise a first functional group comprising a silicon atom, said first functional group being capable of interacting with the hydroxyl groups of an inorganic filler, and a second functional group comprising a sulfur atom, said second functional group being capable of interacting with the copolymer.

Those skilled in the art can find examples of coupling agents in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The use of a coupling agent is not compulsory but is preferable. If a coupling agent is used, the content of coupling agent, in the composition according to the invention, is advantageously between 0.5% and 15% by weight relative to the weight of silica. The amount of coupling agent can easily be adjusted by a person skilled in the art according to the content of reinforcing inorganic filler used in the composition of the invention.

Advantageously, the coupling agent is an organosilane selected from the group consisting of organosilane polysulfides, polyorganosiloxanes, mercaptosilanes, acrylosilanes and methacrylosilanes.

The composition according to the invention can comprise fillers other than silica, but this is not compulsory. These may in particular be organic fillers such as carbon black.

The blacks that can be used in the context of the present invention can be any black conventionally used in pneumatic or non-pneumatic tyres or their treads ("tyre-grade" blacks). Among the latter, mention will be made more particularly of the reinforcing carbon blacks of the 100, 200 and 300 series, or the blacks of the 500, 600 or 700 series (ASTM grades), for instance the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the copolymer, notably an isoprene copolymer, in the form of a masterbatch (see, for example, applications WO 97/36724 and WO 99/16600). Mixtures of several carbon blacks can also be used in the prescribed amounts.

Advantageously, the carbon black is used at a content of less than or equal to 20 phr, more preferentially less than or equal to 10 phr (for example the carbon black content may be in a range extending from 0.5 to 20 phr, in particular extending from 1 to 10 phr). Within the intervals indicated, the colouring properties (black pigmenting agent) and UV-stabilizing properties of the carbon blacks are beneficial, without, moreover, adversely affecting the typical performance qualities contributed by the reinforcing inorganic filler.

Preferably, the filler comprises between 80% and 99% by weight of silica and between 1% and 20% by weight of carbon black.

II-4 Crosslinking System

The composition according to the invention also comprises a crosslinking system comprising at least one radical polymerization initiator, and a co-crosslinking agent selected from the group consisting of (meth)acrylate compounds, maleimide compounds, allyl compounds, vinyl compounds and mixtures thereof.

Radical Polymerization Initiator

The radical polymerization initiators are a source of free radicals necessary for the polymerization of the composition according to the invention. These compounds are well known to those skilled in the art and are described in particular in the documents WO 2002/22688 A1 and FR 2 899 808 A1, for example, as well as in the document Denisov et al. (Handbook of Free Radical Initiators, John Wiley & Sons, 2003).

Preferably, according to the invention, the at least radical polymerization initiator is selected from the group consisting of peroxides, azo compounds, redox (oxidation-reduction) systems and mixtures thereof, preferably from the group consisting of peroxides, azo compounds and mixtures thereof. More preferably, the at least radical polymerization initiator is a peroxide or a mixture of several peroxides. It can be any peroxide known to those skilled in the art. Among the peroxides, which are well known to those skilled in the art, it is preferable to use, in the context of the present invention, an organic peroxide.

The term "organic peroxide" is understood to mean an organic compound, that is to say a compound containing carbon, comprising an —O—O— group (two oxygen atoms connected by a single covalent bond). During the crosslinking process, the organic peroxide decomposes at its unstable O—O bond to give free radicals. These free radicals make possible the creation of the crosslinking bonds.

The organic peroxide is preferably selected from the group comprising or consisting of dialkyl peroxides, monoperoxycarbonates, diacyl peroxides, peroxyketals and peroxyesters.

Preferably, the dialkyl peroxides are selected from the group comprising or consisting of dicumyl peroxide, di(t-butyl) peroxide, t-butyl cumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)hex-3-yne, 2,5-dimethyl-2,5-di(t-amylperoxy)hex-3-yne, α,α'-di[(t-butylperoxy)isopropyl]benzene, α,α'-di[(t-amylperoxy)isopropyl]benzene, di(t-amyl) peroxide, 1,3,5-tri[(t-butylperoxy)isopropyl]benzene, 1,3-dimethyl-3-(t-butylperoxy) butanol and 1,3-dimethyl-3-(t-amylperoxy)butanol.

Certain monoperoxycarbonates, such as OO-tert-butyl O-(2-ethylhexyl) monoperoxycarbonate, OO-tert-butyl O-isopropyl monoperoxycarbonate and OO-tert-amyl O-(2-ethylhexyl) monoperoxycarbonate, can also be used.

Among the diacyl peroxides, the preferred peroxide is benzoyl peroxide.

Among the peroxyketals, the preferred peroxides are selected from the group comprising or consisting of 1,1-di (t-butylperoxy)-3,3,5-trimethylcyclohexane, n-butyl 4,4-di (t-butylperoxy)valerate, ethyl 3,3-di(t-butylperoxy)butyrate, 2,2-di(t-amylperoxy)propane, 3,6,9-triethyl-3,6,9-trimethyl-1,4,7-triperoxynonane (or methyl ethyl ketone peroxide cyclic trimer), 3,3,5,7,7-pentamethyl-1,2,4-trioxepane, n-butyl 4,4-bis(t-amylperoxy)valerate, ethyl 3,3-di(t-amylperoxy)butyrate, 1,1-di(t-butylperoxy)cyclohexane, 1,1-di(t-amylperoxy)cyclohexane and mixtures thereof. Preferably, the peroxyesters are selected from the group consisting of tert-butyl peroxybenzoate, tert-butyl peroxy-2-ethylhexanoate and tert-butyl peroxy-3,5,5-trimethylhexanoate.

To summarize, the organic peroxide is, particularly preferably, selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethyl hexane, n-butyl 4,4-di(tert-butylperoxy)valerate, OO-(t-butyl) O-(2-ethylhexyl) monoperoxycarbonate, tert-butylperoxy isopropyl carbonate, tert-butyl peroxybenzoate, tert-butyl peroxy-3,5,5-trim ethyl hexanoate, 1,3 (4)-bis (tert-butylperoxyisopropyl)benzene and mixtures thereof. More preferably, the organic peroxide is selected from the group consisting of from the group consisting of dicumyl peroxide, n-butyl 4,4-di(tert-butylperoxy)valerate, 00-(t-butyl)O-(2-ethylhexyl) monoperoxycarbonate, tert-butylperoxy isopropyl carbonate, tert-butyl peroxybenzoate, tert-butyl peroxy-3,5,5-trimethylhexanoate, 1,3(4)-bis(tert-butylperoxyisopropyl)benzene and mixtures thereof.

Mention may be made, as examples of commercially available peroxides which can be used in the context of the present invention, of Dicup from Hercules Powder Co., Perkadox Y12 from Noury van der Lande, Peroximon F40 from Montecatini Edison S.p.A., Trigonox from Noury van der Lande, Varox from R.T.Vanderbilt Co. or else Luperko from Wallace & Tiernan Inc.

The term "azo compound" is understood to mean a compound, the molecular structure of which contains at least one —N═N— bond (two nitrogen atoms connected by a covalent double bond).

Preferably, the azo compound is selected from the group consisting of 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N, N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis (2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate and mixtures thereof.

Mention may be made, as an example of a commercially available azo compound which can be used in the context of the present invention, of 2,2'-azobis(isobutyronitrile) from Sigma-Aldrich.

The term "redox systems" is understood to mean a combination of compounds bringing about an oxidation-reduction reaction which generates radicals.

They can, for example, be combinations of peroxides with tertiary amines (for example the pairs: benzoyl peroxide plus dimethylaniline); of hydroperoxides with transition metals (such as the cumene hydroperoxide plus cobalt naphthenate mixture).

Advantageously, the content of radical initiator, preferably of organic peroxide, in the composition according to the invention is within a range extending from 0.1 to 10 phr, preferably from 0.1 to 3 phr, more preferably from 0.2 to 2.5 phr.

The content of radical polymerization initiator in the composition is preferably within a range extending from 1% to 10% by weight, preferably between 1.25% and 8% by weight, preferably between 2% and 5% by weight, preferably between 3% and 4% by weight, relative to the weight of co-crosslinking agent.

Co-Crosslinking Agent

According to the invention, the co-crosslinking agent is selected from the group consisting of (meth)acrylate compounds, maleimide compounds, allyl compounds, vinyl compounds and mixtures thereof.

Preferably, the co-crosslinking agent comprises a (meth) acrylate compound, in the form of metal salt, or of ester or in polymeric form.

More preferably, the co-crosslinking agent comprises an acrylate derivative of formula (VIII):

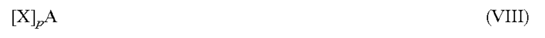

$$[X]_pA \quad \text{(VIII)}$$

in which:

[X]p corresponds to a radical of formula (IX):

(IX)

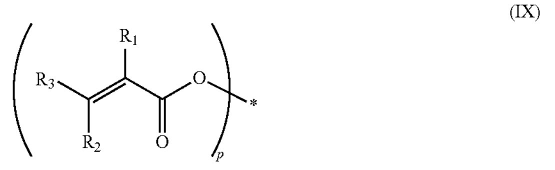

in which:

$R_1$, $R_2$ and $R_3$ independently represent a hydrogen atom or a $C_1$-$C_8$ hydrocarbon group selected from the group consisting of alkyl groups which are linear, branched or cyclic, alkylaryl groups, aryl groups and aralkyls, and which are optionally interrupted by one or more heteroatoms, it being possible for $R_2$ and $R_3$ together to form a non-aromatic ring, (*) represents the point of attachment of the radical of formula (IX) to A, A represents an atom belonging to the group consisting of alkaline earth metals or transition metals, a carbon atom or a $C_1$-$C_{30}$ hydrocarbon group, optionally interrupted and/or substituted by one or more heteroatoms, A comprising p free valencies, p having a value ranging from 2 to 6, it being understood that the 2 to 6×radicals are identical or different.

According to the invention, the bond between X and A can be an ionic bond or a covalent bond. Those skilled in the art clearly understand that, when A represents an atom belonging to the group consisting of alkaline earth metals and transition metals, in particular Zn or Mg, the bond between X and A is an ionic bond. Furthermore, when A represents a carbon atom or a $C_1$-$C_{30}$ hydrocarbon group, those skilled in the art clearly understand that the bond between X and A is a covalent bond.

A cyclic alkyl group is understood to mean an alkyl group comprising one or more rings.

A hydrocarbon group or chain interrupted by one or more heteroatoms is understood to mean a group or chain comprising one or more heteroatoms, each heteroatom being between two carbon atoms of said group or of said chain, or between a carbon atom of said group or of said chain and another heteroatom of said group or of said chain, or between two other heteroatoms of said group or of said chain.

A hydrocarbon group or chain substituted by one or more heteroatoms is understood to mean a group or chain comprising one or more heteroatoms, each heteroatom being connected to the hydrocarbon group or chain by a covalent bond without interrupting the hydrocarbon group or chain.

The heteroatom(s) of A can be selected from the group consisting of oxygen, sulfur, nitrogen, silicon and phosphorus atoms and combinations thereof. Preferably, the heteroatom(s) of A are selected from the group consisting of oxygen and sulfur atoms. More preferably, the heteroatom(s) of A are oxygen atoms.

In other words, A advantageously represents a linear, branched or cyclic $C_4$-$C_{30}$ hydrocarbon group interrupted and/or substituted by one or more heteroatoms selected from oxygen, sulfur, nitrogen, silicon or phosphorus atoms and combinations thereof, preferably selected from the group consisting of oxygen and sulfur atoms. More preferably, A advantageously represents a linear, branched or cyclic, preferably linear or branched, $C_4$-$C_{30}$ hydrocarbon group interrupted and/or substituted by one or more oxygen and/or sulfur atoms, preferably interrupted and/or substituted by one or more oxygen atoms.

Preferably, A represents a linear, branched or cyclic, preferably linear or branched, $C_4$-$C_{30}$ hydrocarbon group interrupted by one or more oxygen and/or sulfur atoms, preferably interrupted by one or more oxygen atoms. More preferably, A represents a linear or branched $C_4$-$C_{30}$ hydrocarbon group interrupted by one or more oxygen atoms.

When A represents a $C_4$-$C_{30}$ hydrocarbon group, it can, for example, be a $C_5$-$C_{20}$, preferably $C_6$-$C_{16}$, hydrocarbon group.

When A comprises a cyclic hydrocarbon group, it can be a non-aromatic or aromatic cyclic hydrocarbon group.

The heteroatom(s) of the $R_1$, $R_2$, $R_3$ and A radicals can be, independently of one another, oxygen, sulfur, nitrogen, phosphorus or silicon atoms, preferably oxygen or nitrogen atoms.

Regardless of the nature of the A radical, $R_1$, $R_2$ and $R_3$ can represent, independently of one another, a hydrogen atom, a methyl group or an ethyl group; preferably, $R_1$, $R_2$ and $R_3$ represent, independently of one another, a hydrogen atom or a methyl group.

Advantageously, $R_1$ can represent a methyl group and $R_2$ and $R_3$ can each represent a hydrogen atom. Alternatively, $R_1$, $R_2$ and $R_3$ can each represent a hydrogen atom.

The valency number p depends on the nature of the A radical. According to the invention, p may be 2, 3, 4, 5 or 6. Preferably, p is 2, 3 or 4, preferably 2 or 3, preferably 2.

Advantageously, regardless of the $R_1$, $R_2$ and $R_3$ groups:

A represents an atom belonging to the group consisting of alkaline earth metals or transition metals, a carbon atom or a $C_1$-$C_{13}$, preferably $C_1$-$C_8$, hydrocarbon group, A comprising p free valencies, p having a value ranging from 2 to 4, it being understood that the 2 to 4×radicals of the acrylate derivative of formula (VIII) are identical or different, preferably identical.

According to the invention, when A represents an atom belonging to the group consisting of alkaline earth metals or transition metals, it can, for example, be an atom selected from the group consisting of Zn and Mg.

When A represents a $C_1$-$C_{13}$, preferably $C_1$-$C_8$, hydrocarbon group, it can, for example, be a $C_1$-$C_7$, preferably $C_1$-$C_6$, hydrocarbon group.

Preferably, A represents a $C_1$-$C_{13}$ hydrocarbon group selected from the group consisting of the following radicals:

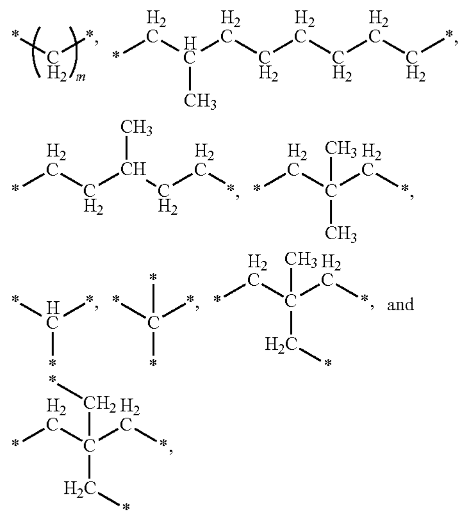

in which m is an integer ranging from 1 to 13, and (*) represents the point of attachment of A to the radical of formula (IX).

Advantageously, the $C_1$-$C_{13}$ hydrocarbon group is a $*-(CH_2)_m-*$ radical in which m is an integer ranging from 1 to 13, preferably from 1 to 8, preferably from 1 to 6, and (*) represents the point of attachment of A to the radical of formula (IX).

Thus, according to the invention, the acrylate derivative of formula (VIII) can be selected from zinc dimethacrylate (ZDMA), magnesium dimethacrylate (MgDMA), zinc diacrylate (ZDA), magnesium diacrylate (MgDA), trimethylolpropane trimethacrylate (TMPTMA), trimethylolpropane triacrylate (TMPTA), 1,6-hexanediol diacrylate (HDDA) and mixtures thereof.

Examples which are available commercially are diacrylate derivatives, such as zinc diacrylate (ZDA), Dymalink 633 from Cray Valley, zinc dimethacrylate (ZDMA), Dymalink 634 from Cray Valley, trimethylolpropane trimethacrylate (TMPTMA), SR351 from Sartomer, or 1,6-hexanediol diacrylate (HDDA) from Sigma-Aldrich.

Advantageously, the content of co-crosslinking agent, and preferably the total content of co-crosslinking agent, in the composition according to the invention is within a range extending from 1 to 20 phr, preferably from 2 to 10 phr, preferably between 2 and 5 phr.

Advantageously, the amount of radical polymerization initiator in the composition is within a range extending from 1% to 10% by weight, preferably between 1.25% and 8% by weight, preferably between 2% and 5% by weight, preferably between 3% and 4% by weight, relative to the weight of co-crosslinking agent in the composition.

Also advantageously, the ratio of the content of silica to the content of co-crosslinking agent is within a range extending from 2 to 9, preferably from 3 to 7.

Sulfur

Furthermore, the composition according to the invention is advantageously free of sulfur as vulcanization agent, or contains less than 0.5 phr, preferably less than 0.3 phr, preferably less than 0.2 phr and preferably less than 0.1 phr thereof. The sulfur can be molecular sulfur or can originate from a sulfur-donating agent, such as alkylphenol disulfides (APDSs).

II-5 Possible Additives

The rubber compositions may optionally also comprise all or some of the usual additives customarily used in elastomer compositions for tyres, for example plasticizers (such as plasticizing oils and/or plasticizing resins), pigments, protective agents such as anti-ozone waxes, chemical antiozonants, antioxidants, anti-fatigue agents, reinforcing resins (as described for example in application WO 02/10269).

II-6 Preparation of the Rubber Compositions

The compositions in accordance with the invention can be manufactured in appropriate mixers using two successive preparation phases well known to those skilled in the art:

a first phase of thermomechanical working or kneading ("non-productive" phase), that can be carried out in a single thermomechanical step during which all the necessary constituents, in particular the elastomer matrix, the filler, the optional other various additives, with the exception of the radical polymerization initiator, are introduced into an appropriate mixer, such as a standard internal mixer (for example of 'Banbury' type). The optional filler can be incorporated into the elastomer in one or more portions while thermomechanically kneading. In the case where the filler is already incorporated, in full or in part, in the elastomer in the form of a masterbatch, as is described, for example, in applications WO 97/36724 and WO 99/16600, it is the masterbatch which is directly kneaded and, if appropriate, the other elastomers or fillers present in the composition which are not in the masterbatch form, and also the optional other various additives other than the radical polymerization initiator, are incorporated. The non-productive phase can be carried out at high temperature, up to a maximum temperature of between 110° C. and 200° C., preferably between 130° C. and 185° C., for a period of time generally of between 2 and 10 minutes;

a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The radical polymerization initiator is then incorporated and the combined mixture is then mixed for a few minutes, for example between 5 and 15 min.

Such phases have been described, for example, in applications EP-A-0501227, EP-A-0735088, EP-A-0810258, WO 00/05300 or WO 00/05301.

The final composition thus obtained is then calendered, for example in the form of a sheet or of a slab, in particular for laboratory characterization, or else extruded (or coextruded with another rubber composition) in the form of a rubber semi-finished product (or profiled element) which can be used, for example, as a tyre tread. These products can subsequently be used for the manufacture of tyres, according to techniques known to those skilled in the art.

The crosslinking of the composition can be carried out in a manner known to those skilled in the art, for example at a temperature of between 130° C. and 200° C., under pressure.

Also described in the present document is a process for preparing the rubber composition in accordance with the invention further comprising a crosslinking system comprising the following steps:

adding, during a first "non-productive" step, to the copolymer, the 1,3-dipolar compound and the filler, while thermomechanically kneading until a maximum temperature of between 130° C. and 200° C. is reached, cooling the combined mixture to a temperature below 100° C., subsequently incorporating the radical polymerization initiator, kneading the combined mixture up to a maximum temperature below 120° C.

The amount of 1,3-dipolar compound added is preferentially between 0 and 3 molar equivalents, more preferentially between 0 and 2 molar equivalents, more preferentially still between 0 and 1 molar equivalent, indeed even more preferably still between 0 and molar equivalents, of imidazole ring per 100 mol of monomer units constituting the copolymer. For each of these preferred ranges, the lower limit is preferably at least 0.1 molar equivalents of 1,3-dipolar compound.

Advantageously, the 1,3-dipolar compound is mixed with the copolymer before the introduction of the other constituents of the rubber composition, in particular before the addition of the filler. The contact time between the copolymer and the 1,3-dipolar compound which are intimately mixed, in particular thermomechanically kneaded, is adjusted as a function of the conditions of the mixing, in particular of the thermomechanical kneading, notably as a function of the temperature. The higher the temperature, the shorter this contact time. Typically, it is from 1 to 5 minutes for a temperature of 100° C. to 130° C.

Preferably, at least one antioxidant is preferably added to the copolymer before it is introduced into a mixer, in particular at the end of the synthesis of the copolymer, as is done conventionally.

After incorporating all the ingredients of the rubber composition, the final composition thus obtained is then calendered, for example in the form of a sheet or slab, in particular for laboratory characterization, or else extruded, in order to form, for example, a rubber profiled element that is used as rubber component for the manufacture of the tyre.

II-7 Rubber Articles

Another subject of the present invention is a rubber article comprising at least one composition according to the invention.

Given the improved performance compromise within the context of the present invention, the rubber article is advantageously selected from the group consisting of pneumatic tyres, non-pneumatic tyres, caterpillar tracks and conveyor belts. Preferably, the rubber article is a pneumatic or non-pneumatic tyre.

More particularly, another subject of the invention is a pneumatic or non-pneumatic tyre provided with a tread comprising at least one composition according to the invention.

Another subject of the invention is a rubber caterpillar track comprising at least one rubber element comprising at least one composition according to the invention, the at least one rubber element being preferably an endless rubber belt or a plurality of rubber pads, and also a rubber conveyor belt comprising a composition according to the invention.

The invention relates to the rubber articles described above both in the uncured state (that is to say, before curing) and in the cured state (that is to say, after crosslinking or vulcanization).

III—PREFERRED EMBODIMENTS

In the light of the above, the preferred embodiments of the invention are described below:

1. Rubber composition based on at least:
   an elastomer matrix comprising more than 50 phr of a copolymer containing ethylene units and 1,3-diene units, the ethylene units in the copolymer representing more than 50 mol % of the monomer units of the copolymer,
   a 1,3-dipolar compound corresponding to the formula (I)

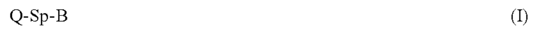

Q-Sp-B (I)

in which:
   Q comprises a dipole containing at least and preferably one nitrogen atom,
   Sp, which is preferably divalent, is an atom or a group of atoms connecting Q to B,
   B comprises an imidazole ring corresponding to the following formula (II):

(II)

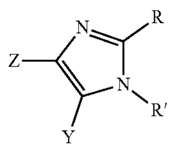

in which:
   three of the four symbols Z, Y, R and R', which are identical or different, each represent an atom or a group of atoms, it being possible for Z and Y to form, together with the carbon atoms to which they are attached, a ring,
   and the fourth symbol Z, Y, R or R' denotes a direct attachment to Sp,
   a filler comprising predominantly silica,
   a crosslinking system comprising at least one radical polymerization initiator, and a co-crosslinking agent selected from the group consisting of (meth)acrylate compounds, maleimide compounds, allyl compounds, vinyl compounds and mixtures thereof.
2. Composition according to embodiment 1, in which the ethylene units in the copolymer represent between 50 mol % and 95 mol %, preferably between 55 mol % and mol %, of the monomer units of the copolymer.
3. Composition according to either one of the preceding embodiments, in which the copolymer containing ethylene units and 1,3-diene units is a copolymer of ethylene and of 1,3-diene.
4. Composition according to any one of the preceding embodiments, in which the 1,3-diene is 1,3-butadiene.
5. Composition according to any one of the preceding embodiments, in which the copolymer contains units of formula (III) or units of formula (IV) or else units of formula (III) and of formula (IV):

(III)

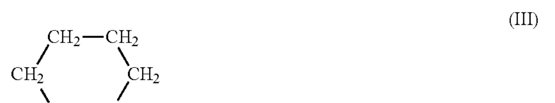

(IV)

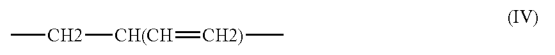

6. Composition according to any one of the preceding embodiments, in which the molar percentages of the units of formula (III) and of the units of formula (IV) in the copolymer, respectively o and p, satisfy the following equation (eq. 1), preferentially satisfy the equation (eq. 2), o and p being calculated on the basis of all the monomer units of the copolymer $$0<o+p\leq 25 \quad \text{(eq. 1)}$$

$$0<o+p\leq 20 \quad \text{(eq. 2)}$$

7. Composition according to any one of the preceding embodiments, in which the copolymer containing ethylene units and 1,3-diene units is a random copolymer.
8. Composition according to any one of the preceding embodiments, in which the content of the copolymer containing ethylene units and 1,3-diene units is within a range extending from 60 to 100 phr, preferably from 80 to 100 phr.
9. Composition according to any one of the preceding embodiments, in which R' denotes a direct attachment to Sp.
10. Composition according to any one of the preceding embodiments, in which Z and Y are each a hydrogen atom.
11. Composition according to any one of embodiments 1 to 9, in which Z and Y form, together with the carbon atoms to which they are attached, a ring, preferably an aromatic ring.
12. Composition according to any one of the preceding embodiments, in which R represents a hydrogen atom or a carbon-based group which can contain at least one heteroatom and preferably containing from 1 to 20 carbon atoms.

13. Composition according to any one of the preceding embodiments, in which R is an aliphatic group, preferentially an alkyl group which preferably contains from 1 to 12 carbon atoms.

14. Composition according to any one of the preceding embodiments, in which R is a methyl.

15. Composition according to any one of the preceding embodiments, in which Sp is a group containing up to 20 carbon atoms and which can contain at least one heteroatom.

16. Composition according to any one of the preceding embodiments, in which Sp is an aliphatic group preferentially containing from 1 to 20 carbon atoms, more preferentially from 1 to 12 carbon atoms, more preferentially still from 1 to 6 carbon atoms, or an aromatic group preferentially containing from 6 to 20 carbon atoms and more preferentially from 6 to 12 carbon atoms.

17. Composition according to any one of the preceding embodiments, in which Sp is an alkylene group containing from 1 to 20 carbon atoms, preferentially from 1 to 12 carbon atoms, more preferentially from 1 to 6 carbon atoms and more preferentially still from 1 to 3 carbon atoms, or an arylene group preferentially containing from 6 to 20 carbon atoms and more preferentially from 6 to 12 carbon atoms.

18. Composition according to any one of the preceding embodiments, in which the 1,3-dipolar compound is selected from the group consisting of nitrile oxides, nitrile imines and nitrones.

19. Composition according to any one of the preceding embodiments, in which Q contains a —C≡N→O unit.

20. Composition according to any one of the preceding embodiments, in which Q comprises, preferably represents, the unit corresponding to the formula (V):

(V)

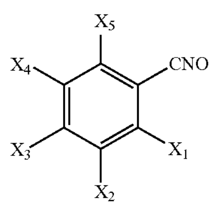

in which:

four of the five symbols $X_1$ to $X_5$, which are identical or different, are each an atom or a group of atoms, preferentially an aliphatic group or an aromatic group, and the fifth symbol denotes a direct attachment to Sp, it being known that $X_1$ and $X_5$ are not hydrogen atoms.

21. Composition according to embodiment 20, in which $X_1$, $X_3$ and $X_5$ are identical.

22. Composition according to embodiment 20 or 21, in which $X_1$, $X_3$ and $X_5$ are each an alkyl group of 1 to 6 carbon atoms, preferentially of 1 to 3 carbon atoms.

23. Composition according to any one of embodiments 20 to 22, in which $X_1$, $X_3$ and $X_5$ are each a methyl or ethyl, preferably a methyl.

24. Composition according to any one of the preceding embodiments, in which the 1,3-dipolar compound is 2,4,6-trimethyl-34(2-methyl-1H-imidazol-1-yl) methyl)benzonitrile oxide or 2,4,6-triethyl-34(2-methyl-1H-imidazol-1-yl)methyl)benzonitrile oxide, preferably 2,4,6-trimethyl-34(2-methyl-1H-imidazol-1-yl)methyl)benzonitrile oxide.

25. Composition according to any one of the preceding embodiments, in which the content of 1,3-dipolar compound is between 0 and 50 molar equivalents, preferably between 0.01 and 15 molar equivalents, for example between 4 and 15 molar equivalents, per 100 mol of monomer units constituting the copolymer.

26. Composition according to any one of embodiments 1 to 24, in which the content of 1,3-dipolar compound is between 0.1 and 3 molar equivalents, preferentially between and 2 molar equivalents, even more preferentially between 0.1 and 1 molar equivalent, indeed even more preferentially between 0.1 and 0.7 molar equivalents, of imidazole ring per 100 mol of monomer units constituting the diene elastomer.

27. Composition according to any one of the preceding embodiments, in which the filler comprises more than 70% by weight, preferably more than 80% by weight, of silica.

28. Composition according to any one of the preceding embodiments, in which the filler comprises between 80% and 99% by weight of silica and between 1% and 20% by weight of carbon black.

29. Composition according to any one of the preceding embodiments, in which the content of silica is within a range extending from 5 to 60 phr, preferably from 10 to 55 phr, more preferably from 15 to 50 phr.

30. Composition according to any one of the preceding embodiments, further comprising an agent for coupling the silica to the copolymer, the coupling agent preferably being an organosilane selected from the group consisting of organosilane polysulfides, polyorganosiloxanes, mercaptosilanes, acrylosilanes and methacrylosilanes.

31. Composition according to any one of the preceding embodiments, in which the radical polymerization initiator is selected from the group consisting of peroxides, azo compounds, redox (oxidation/reduction) systems and mixtures thereof.

32. Composition according to any one of the preceding embodiments, in which the radical polymerization initiator is an organic peroxide selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4'-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis (tert-butylperoxyisopropyl)benzene and mixtures thereof, preferably from the group consisting of dicumyl peroxide, n-butyl 4,4'-di(tert-butylperoxy) valerate, 00-(t-butyl)O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and mixtures thereof.

33. Composition according to any one of the preceding embodiments, in which the content of radical polymerization initiator is within a range extending from 0.1 to 3 phr, preferably from 0.2 to 2.5 phr.

34. Composition according to any one of the preceding embodiments, in which the content of radical polymerization initiator is within a range extending from 1% to 10% by weight, preferably between 1.25% and 8% by weight, preferably between 2% and 5% by weight, preferably between 3% and 4% by weight, relative to the weight of co-crosslinking agent.

35. Composition according to any one of the preceding embodiments, in which the co-crosslinking agent comprises an acrylate derivative of formula (VIII):

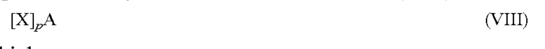 (VIII)

in which:

[X]p corresponds to a radical of formula (IX):

(IX)

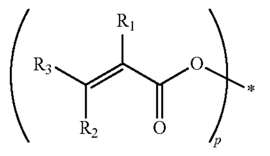

in which:

$R_1$, $R_2$ and $R_3$ independently represent a hydrogen atom or a $C_1$-$C_8$ hydrocarbon group selected from the group consisting of alkyl groups which are linear, branched or cyclic, alkylaryl groups, aryl groups and aralkyls, and which are optionally interrupted by one or more heteroatoms, it being possible for $R_2$ and $R_3$ together to form a non-aromatic ring, (*) represents the point of attachment of the radical of formula (IX) to A, A represents an atom belonging to the group consisting of alkaline earth metals or transition metals, a carbon atom or a $C_1$-$C_{30}$ hydrocarbon group, optionally interrupted and/or substituted by one or more heteroatoms, A comprising p free valencies, p having a value ranging from 2 to 6, it being understood that the 2 to 6×radicals are identical or different.

36. Composition according to embodiment 35, in which, in the acrylate derivative of formula (VIII):

A represents an atom belonging to the group consisting of alkaline earth metals or transition metals, a carbon atom or a $C_1$-$C_{13}$ hydrocarbon group, A comprising p free valencies, p having a value ranging from 2 to 4, it being understood that the 2 to 4×radicals are identical or different.

37. Composition according to embodiment 35 or 36, in which $R_1$, $R_2$ and $R_3$ represent, independently of one another, a hydrogen atom, a methyl group or an ethyl group.

38. Composition according to any one of embodiments 35 to 37, in which $R_1$ represents a methyl group and $R_2$ and $R_3$ each represent a hydrogen atom.

39. Composition according to any one of embodiments 35 to 37, in which $R_1$, $R_2$ and $R_3$ each represent a hydrogen atom.

40. Composition according to any one of embodiments 35 to 39, in which p is 2 or 3, preferably 2.

41. Composition according to any one of embodiments 35 to 39, in which A represents an atom selected from the group consisting of Zn and Mg.

42. Composition according to any one of embodiments 35 to 39, in which A represents a $C_1$-$C_{13}$ hydrocarbon group selected from the group consisting of the following radicals:

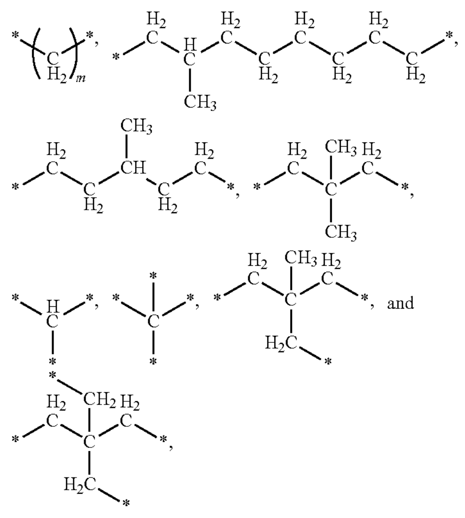

and in which m is an integer ranging from 1 to 13, and (*) represents the point of attachment of A to the radical of formula (IX).

43. Composition according to any one of the preceding embodiments, in which the content of co-crosslinking agent is within a range extending from 1 to 20 phr, preferably from 2 to 10 phr, preferably between 2 and 5 phr.

44. Composition according to any one of the preceding embodiments, in which the ratio of the content of silica to the content of co-crosslinking agent is within a range extending from 2 to 9, preferably from 3 to 7.

45. Composition according to any one of the preceding embodiments, in which the composition does not contain molecular sulfur or sulfur-donating agent as vulcanizing agent or contains less than 0.5 phr, preferably less than 0.3 phr, more preferably less than 0.1 phr thereof.

46. Rubber article comprising a composition as defined in any one of embodiments 1 to 45.

47. Rubber article according to embodiment 46, said article being selected from the group consisting of pneumatic tyres, non-pneumatic tyres, rubber caterpillar tracks and conveyor belts.

48. Pneumatic or non-pneumatic tyre comprising a composition as defined in any one of embodiments 1 to 45.

49. Pneumatic or non-pneumatic tyre according to embodiment 48, in which the composition defined in any one of embodiments 1 to 45 is present in the tread.

IV—EXAMPLES

IV-1 Measurements and Tests Used

Determination of the Molar Masses: Size Exclusion Chromatography Analysis of the Copolymers a) For the copolymers which are soluble at ambient temperature in tetrahydrofuran (THF), the molar masses were determined by size exclusion chromatography in THF. The samples were injected using a Waters 717 injector and a Waters 515 HPLC pump at a flow rate of 1 ml·min$^{-1}$ in a series of Polymer Laboratories columns. This series of columns, placed in a chamber thermostatically maintained at 45° C., is composed of:

1 PL Gel 5 μm precolumn,

2 PL Gel 5 μm Mixed C columns,

1 PL Gel 5 μm-500 Å column.

The detection was performed using a Waters 410 refractometer. The molar masses were determined by universal calibration using polystyrene standards certified by Polymer Laboratories and a double detection with a refractometer and coupling to the viscometer.

Without being an absolute method, SEC makes it possible to comprehend the molecular mass distribution of a polymer. On the basis of standard commercial products of polystyrene type, the various number-average masses (Mn) and weight-average masses (Mw) can be determined and the polydispersity index calculated (PI=Mw/Mn).

b) For the copolymers which are insoluble in tetrahydrofuran at ambient temperature, the molar masses were determined in 1,2,4-trichlorobenzene. They were first dissolved under hot conditions (4 hours at 150° C.) and were then injected at 150° C., at a flow rate of 1 $ml \cdot min^{-1}$, into a Waters Alliance GPCV 2000 chromatograph equipped with three Styragel columns (two HT6E columns and one HT2 column). The detection was performed using a Waters refractometer. The molar masses were determined by relative calibration using polystyrene standards certified by Polymer Laboratories.

Determination of the Mole Fractions

Reference is made to the paper "Investigation of ethylene/butadiene copolymers microstructure by $^{1}H$ and $^{13}C$ NMR", Llauro M. F., Monnet C., Barbotin F., Monteil V., Spitz R., Boisson C., Macromolecules 2001, 34, 6304-6311, for a detailed description of the $^{1}H$ NMR and $^{13}C$ NMR techniques which have been specifically used in the present application to determine the mole fractions of the ethylene units, the conjugated diene units and of any trans-1,2-cyclohexane units.

NMR Analysis

The structural analysis and also the determination of the molar purities of the molecules synthesized are carried out by an NMR analysis. The spectra are acquired on a Bruker Avance 3400 MHz spectrometer equipped with a 5 mm BBFO Z-grad "broad band" probe. The quantitative 1H NMR experiment uses a simple 30° pulse sequence and a repetition time of 3 seconds between each of the 64 acquisitions. The samples are dissolved in deuterated dimethyl sulfoxide (DMSO). This solvent is also used for the lock signal. Calibration is carried out on the signal of the protons of the deuterated DMSO at 2.44 ppm with respect to a TMS reference at 0 ppm. The $^{1}H$ MR spectrum coupled with the 2D $^{1}H/^{13}C$ HSQC and $^{1}H/^{13}C$ HMBC experiments enables the structural determination of the molecules (cf. assignment tables). The molar quantifications are performed from the quantitative 1D $^{1}H$ NMR spectrum.

Mooney ML 1+4

The Mooney plasticity measurement is carried out according to the following principle and in accordance with Standard ASTM D-1646. The generally uncured polymer is moulded in a cylindrical chamber heated to a given temperature, usually 100° C. After preheating for one minute, an L-type rotor rotates within the test specimen at 2 revolutions/minute and the working torque for maintaining this movement is measured after rotating for 4 minutes. The Mooney plasticity (ML 1+4) is expressed in "Mooney units" (MU, where 1 MU=0.83 newton.metre).

Dynamic Properties (after Curing): Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the nominal (or apparent) secant modulus measured in first elongation, calculated by normalizing to the initial cross section of the test specimen. The nominal secant moduli (or apparent stresses, in MPa) are measured in first elongation at 100% and 300% elongation, respectively denoted MSA100 and MSA300. The reinforcement index, which is the ratio of the MSA300 modulus to the MSA100 modulus, is expressed in base 100 relative to the control composition T1. A value greater than 100 expresses an improvement in the reinforcement of the composition under consideration compared to the control composition.

The elongation at break (EB %) and breaking stress (BS) tests are based on Standard NF ISO 37 of December 2005 on an H2 dumbbell test specimen and are measured at a tensile speed of 500 mm/min. The elongation at break is expressed as a percentage of elongation. The breaking stress is expressed in MPa. These values are expressed in base 100 relative to the control composition T1. A value greater than 100 expresses an improvement in the mechanical properties of the composition under consideration compared to the control composition.

All these tensile measurements are carried out under the standard conditions of temperature (23±2° C.) and hygrometry (50±5% relative humidity), according to French Standard NF T 40-101 (December 1979).

The dynamic properties G* and tan(δ)max were measured on a viscosity analyser (Metravib VA4000) according to Standard ASTM D 5992-96. The response of a sample of crosslinked composition (cylindrical test specimen with a thickness of 4 mm and a cross section of 400 mm 2), subjected to a simple alternating sinusoidal shear stress, at a frequency of 10 Hz, under defined temperature conditions, for example at 60° C., according to Standard ASTM D 1349-99, was recorded. A strain amplitude sweep was carried out from 0.15% to 50% (outward cycle) and then from 50% to 0.15% (return cycle). The results made use of are the non-linearity (NL or ΔG*) and the loss factor tan(o). The maximum value of tan(o) observed, denoted tan(δ)max, is indicated for the return cycle. The non-linearity (NL or ΔG*) is the difference in shear modulus between and 50% strain, expressed in MPa. The non-linearity and tan(δ)max are expressed in base 100 relative to the control composition T1. A value of less than 100 expresses an improvement in the hysteresis and therefore in the rolling resistance of the composition under consideration compared with the control composition.

IV-2 Synthesis of the 1,3-Dipolar Compound 2,4,6-trimethyl-3-((2-methyl-1H-imidazol-1-yl)methyl) benzonitrile oxide This compound may be prepared according to the following reaction scheme:

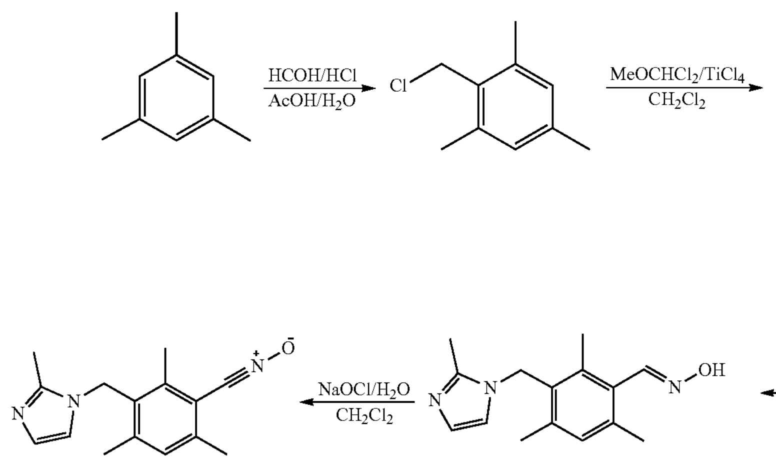

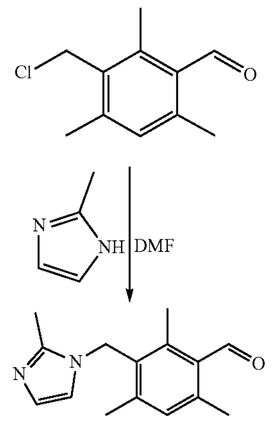

IV.2-1-Synthesis of 2-(chloromethyl)-1,3,5-trimethylbenzene

This compound can be obtained according to the procedure described in the paper by Zenkevich, I. G.; Makarov, A. A.; Russian Journal of General Chemistry; vol. 77; no. 4 (2007), pp. 611-619 (Zhurnal Obshchei Khimii, Vol. 77, No. 4 (2007), pp. 653-662).

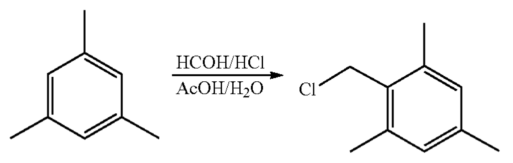

A mixture of mesitylene (100.0 g, 0.832 mol), paraformaldehyde (26.2 g, 0.874 mol) and hydrochloric acid (240 ml, 37%, 2.906 mol) in acetic acid (240 ml) is stirred and heated very slowly (1.5 hours) up to 37° C. After returning to ambient temperature, the mixture is diluted with water (1.01) with $CH_2Cl_2$ (200 ml) and the product is extracted with $CH_2Cl_2$ (4 times with 50 ml). The organic phases are combined, then washed with water (5 times with 100 ml) and evaporated down to 11-12 mbar (temperature of the bath=42° C.). A colourless oil (133.52 g, yield 95%) is obtained. After 15-18 hours at +4° C., the oil crystallized. The crystals are filtered off, washed with petroleum ether cooled to −18° C. (40 ml), then dried under atmospheric pressure at ambient temperature for 3 to 5 hours. A white solid (95.9 g, yield 68%) with a melting point of 39° C. is obtained. The molar purity is greater than 96% (1H NMR).

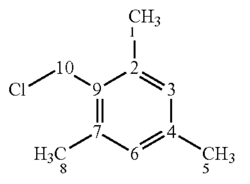

| No. | δ $^1H$ (ppm) | δ $^{11}C$ (ppm) |
|---|---|---|
| 1-8 | 2.27 | 18.4 |
| 2-7 | — | 136.9 |
| 3-6 | 6.81 | 128.5 |
| 4 | — | 137.4 |
| 5 | 2.15 | 20.3 |
| 9 | — | 130.5 |
| 10 | 4.69 | 41.3 |

IV.2-2-Synthesis of 3-(chloromethyl)-2,4,6-trimethylbenzaldehyde

This compound can be obtained according to a procedure described in the paper by Yakubov, A. P.; Tsyganov, D. V.; Belen'kii, L. I.; and Krayushkin, M. M., Bulletin of the Academy of Sciences of the USSR, Division of Chemical Science (English Translation); Vol. 40; No. 7.2 (1991), pp. 1427-1432 (Izvestiya Akademii Nauk SSSR, Seriya Khimicheskaya; No. 7 (1991), pp. 1609-1615).

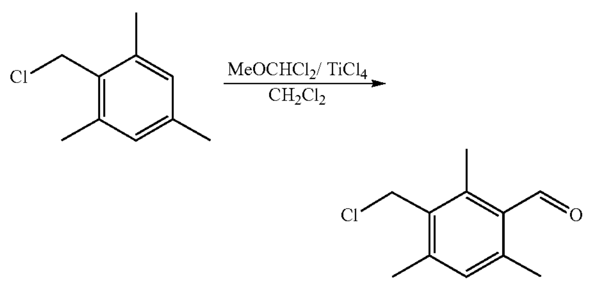

A solution of 2-(chloromethyl)-1,3,5-trimethylbenzene (20.0 g, 0.118 mol) and dichloromethyl methyl ether (27.26 g, 0.237 mol) in dichloromethane (200 ml) is added under argon over 10-12 minutes to a solution of $TiCl_4$ (90.0 g, 0.474 mol) in dichloromethane (200 ml) at 17° C. After stirring at 17-20° C. for 15-20 minutes, water (1000 ml) and ice (500 g) are added to the reaction medium. After stirring for 10-15 minutes, the organic phase is separated. The aqueous phase is extracted with $CH_2Cl_2$ (3 times with 75 ml). The combined organic phases are washed with water (4 times with 100 ml) and evaporated under reduced pressure to result in a solid (temperature of the bath=28° C.). The target product (22.74 g) is obtained with a yield of 97%. Its melting point is 58° C. The molar purity, estimated by $^{1}$H NMR, is 95 mol %.

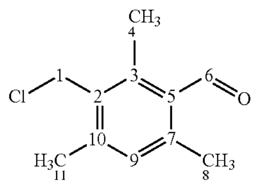

| No. | δ $^{1}$H (ppm) | δ $^{11}$C (ppm) |
|---|---|---|
| 1 | 4.77 | 40.6 |
| 2 | — | 132.9 |
| 3 | — | 139.5 |
| 4 | 2.51 | 14.4 |
| 5 | — | 131.4 |
| 6 | 10.43 | 194.2 |
| 7 | — | 140.1 |
| 8 | 2.41 | 19.3 |
| 9 | 6.99 | 131.2 |
| 10 | — | 142.4 |
| 11 | 2.34 | 19.8 |

IV.2-3-Synthesis of 2,4,6-trimethyl-3-((2-methyl-1H-imidazol-1-yl)methyl)benzaldehyde

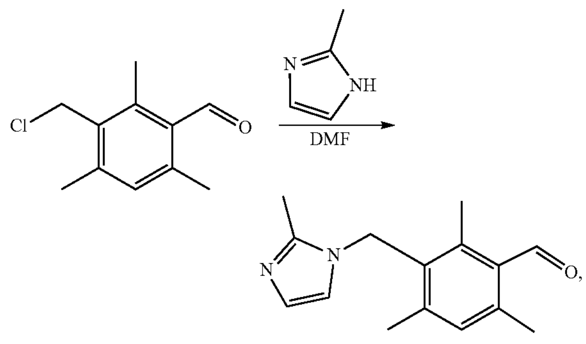

A mixture of 3-(chloromethyl)-2,4,6-trimethylbenzaldehyde (10.0 g, 0.051 mol) and imidazole (10.44 g, 0.127 mol) in DMF (10 ml) is stirred at 80° C. for one hour.

After returning to 40-50° C., the mixture is diluted with water (200 ml) and stirred for 10 minutes. The precipitate obtained is filtered off, washed on the filter with water (4 times with 25 ml) and then dried at ambient temperature. A white solid (7.92 g, yield 64%) with a melting point of 161° C. is obtained. The molar purity is 91% ('H NMR).

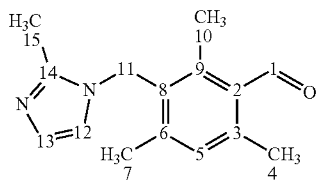

| No. | δ $^{1}$H (ppm) | δ $^{11}$C (ppm) |
|---|---|---|
| 1 | 10.45 | 194.2 |
| 2 | — | 131.5 |
| 3 | — | 139.5 |
| 4 | 2.44 | 19.6 |
| 5 | 7.04 | 131.2 |
| 6 | — | 142.5 |
| 7 | 2.19 | 19.5 |
| 8 | — | 131 |
| 9 | — | 139.5 |
| 10 | 2.34 | 14.6 |
| 11 | 5.02 | 42.5 |
| 12 | 6.24 | 116.9 |
| 13 | 6.59 | 125.9 |
| 14 | — | 143.5 |
| 15 | 2.32 | 12.7 |

IV.2-4-Synthesis of 2,4,6-trimethyl-3-(2-methyl-1H-imidazol-1-yl)methyl)benzaldehyde oxime

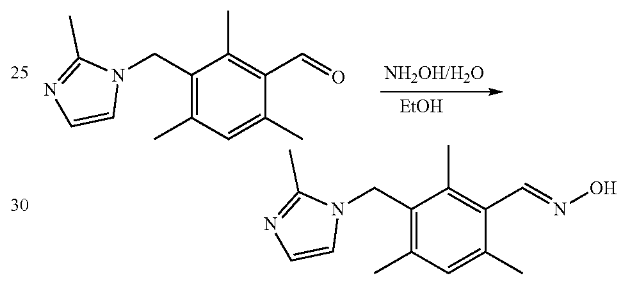

An aqueous hydroxylamine solution (809 g, 0.134 mol, 50% in water, Aldrich) in EtOH (10 ml) is added to a solution of 2,4,6-trimethyl-3-((2-methyl-1H-imidazol-1-yl)methyl)benzaldehyde (20.3 g, 0.084 mol) in EtOH (110 ml) at 40° C. The reaction medium is stirred at a temperature of 50 to 55° C. for 2.5 hours. After returning to 23° C., the precipitate obtained is filtered off, washed twice on the filter with an $EtOH/H_2O$ (10 ml/15 ml) mixture and dried under atmospheric pressure at ambient temperature for 15 to 20 hours. A white solid (19.57 g, yield 91%) with a melting point of 247° C. is obtained. The molar purity is greater than 87% ($^{1}$H NMR).

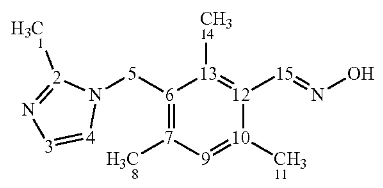

| No. | δ $^{1}$H (ppm) | δ $^{11}$C (ppm) |
|---|---|---|
| 1 | 2.31 | 12.7 |
| 2 | — | 143.4 |
| 3 | 6.58 | 125.8 |
| 4 | 6.22 | 116.9 |
| 5 | 4.97 | 43.2 |
| 6 | — | 129.3 |
| 7 | — | 136.2 |
| 8 | 2.23 | 20.2 |

-continued

| No. | $\delta$ $^{1}H$ (ppm) | $\delta$ $^{11}C$ (ppm) |
|---|---|---|
| 9 | 6.97 | 130 |
| 10 | — | 137.3 |
| 11 | 2.15 | 19.1 |
| 12 | — | 129.1 |
| 13 | — | 136.1 |
| 14 | 2.11 | 15.9 |
| 15 | 8.25 | 147.4 |
| OH | 11.11 | — |

IV.2-5-Synthesis of 2,4,6-trimethyl-3-((2-methyl-1H-imidazol-1-yl)methyl)benzonitrile oxide

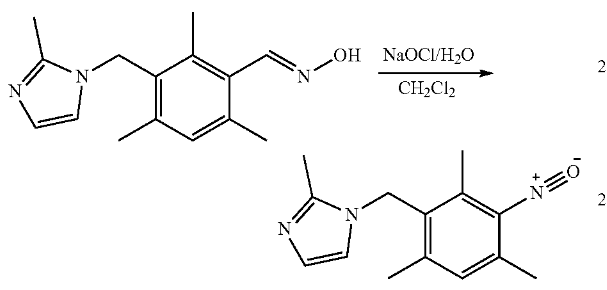

An aqueous solution of NaOCl (4% of active chlorine, Aldrich, 49 ml) is added dropwise over 5 minutes to a mixture of 2,4,6-trimethyl-3-((2-methyl-1H-imidazol-1-yl)methyl)benzaldehyde oxime (8.80 g, 0.034 mol) in $CH_2Cl_2$ (280 ml) at 6° C. The temperature of the reaction medium is maintained between 6° C. and 8° C. The reaction medium is subsequently stirred at 8° C. to 21° C. for 2 hours. The organic phase is separated. The organic phase is washed with water (3 times with 50 ml). After concentrating under reduced pressure (temperature of the bath=22-23° C., 220 mbar), petroleum ether (10 ml) is added, the solvent is evaporated down to 8-10 ml and the solution is maintained at −18° C. for 10-15 hours, so as to obtain a precipitate. The precipitate is filtered off, washed on the filter with the $CH_2Cl_2$/petroleum ether (2 ml/6 ml) mixture and then with petroleum ether (2 times 10 ml), and finally dried under atmospheric pressure at ambient temperature for 10-15 hours. A white solid (5.31 g, yield 61%) with a melting point of 139° C. is obtained.

The molar purity is greater than 95 mol % NMR).

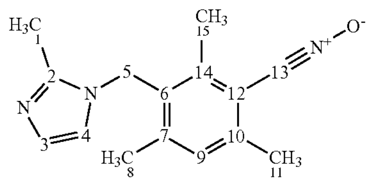

| No. | $\delta$ $^{1}H$ (ppm) | $\delta$ $^{11}C$ (ppm) |
|---|---|---|
| 1 | 2.3 | 12.6 |
| 2 | — | 143.6 |
| 3 | 6.59 | 126.1 |
| 4 | 6.27 | 117.1 |

-continued

| No. | $\delta$ $^{1}H$ (ppm) | $\delta$ $^{11}C$ (ppm) |
|---|---|---|
| 5 | 4.99 | 43 |
| 6 | — | 130.6 |
| 7 | — | 140.7 |
| 8 | 2.16 | 19.2 |
| 9 | 7.12 | 129.9 |
| 10 | — | 141 |
| 11 | 2.34 | 20 |
| 12 | — | 112.1 |
| 13 | — | NI |
| 14 | — | 140.8 |
| 15 | 2.28 | 17.7 |

IV-3 Preparation of the Compositions

In the examples which follow, the rubber compositions were produced as described in point 11-6 above. In particular, these compositions are manufactured in the following way: the elastomer, where appropriate the 1,3-dipolar compound, which is kneaded alone with the elastomer at 110° C. for around 2 minutes, then the silica, the coupling agent, the co-crosslinking agent and also the various other ingredients, with the exception of the peroxide, are introduced into an internal mixer (final degree of filling: around 70% by volume), the initial vessel temperature of which is around 110° C. Thermomechanical working (non-productive phase) is then carried out in one step, which lasts around 5 to 6 minutes, until a maximum “dropping” temperature of 160° C. is reached. The mixture thus obtained is recovered and cooled and then the peroxide is incorporated on a mixer (homofinisher) at 23° C., everything being mixed (productive phase) for an appropriate time (for example between 5 and 12 min).

The compositions thus obtained are subsequently calendered, either in the form of slabs (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tyres, in particular for treads.

The crosslinking is carried out at 150° C. The crosslinking time applied, f c (90), is the time necessary for the torque of the composition to reach 90% of the maximum torque of the composition. The torques of the composition are measured at 150° C. with an oscillating disc rheometer, according to Standard DIN 53529—Part 3 (June 1983). $t'_c$ (90) is determined according to Standard NF T 43-015 for each of the compositions. It varies approximately from 20 to 40 minutes from one composition to another.

IV-4 Tests on Rubber Compositions

The object of the examples presented below is to compare the performance compromise between the reinforcement, the breaking stress and the rolling resistance of a composition in accordance with the present invention (C1) with three control competitions (T1 to T3).

The compositions tested (in phr), as well as the results obtained, are presented in Table 1.

The control compositions differ from composition C1 in accordance with the invention in that they do not comprise a 1,3-dipolar compound and/or a co-crosslinking agent in accordance with the invention.

TABLE 1

| Components | T1 | T2 | T3 | C1 |
|---|---|---|---|---|
| EBR(1) | 100 | 100 | 100 | 100 |
| 1,3-Dipolar compound (2) | — | 2.1 | — | 2.1 |
| Silica(3) | 30 | 30 | 30 | 30 |
| Coupling agent(4) | 3 | 3 | 3 | 3 |
| Peroxide (5) | 1.6 | 1.6 | 1.6 | 1.6 |
| Co-crosslinking agent (6) | — | — | 5 | 5 |
| Properties | | | | |
| MSA300/MSA100 | 100 | 111 | 310 | 329 |
| BS at 23° C. | 100 | 93 | 176 | 162 |
| NL at 60° C. | 100 | 41 | 118 | 25 |

(1)Elastomer containing 79 mol % of ethylene units, 7 mol % of 1,2-cyclohexanediyl units, 8 mol % of 1, 2 units, and 6 mol % of 1, 4 units; Mooney at 100° C.: 60; Mn: 156 600 g/mol
(2) 1,3-dipolar compound, the synthesis of which is described above in section IV.2 (2,4,6-trimethyl-3-((2-methyl-1H-imidazol-1-yl)methyl)benzonitrile oxide)
(3)Silica, Zeosil 1165MP from Solvay
(4)Triethoxysilylpropyltetrasulfide (TESPT) liquid silane, Si69 from Evonik
(5) 1,1-Bis(tert-butylperoxy)-3,5,5-trimethylcyclohexane, Luperox 231 from Arkema
(6) Hexanediol diacrylate (HDDA), SR238 from Sartomer The results presented in Table 1 above show that the specific combination of a 1,3-dipolar compound and of a co-crosslinking agent in accordance with the invention in a composition based on a highly saturated diene elastomer crosslinked with peroxide makes it possible to greatly improve the reinforcement of the composition and the rolling resistance, while exhibiting an improved breaking stress compared to the control composition T1.

The compositions in accordance with the invention are useful for numerous applications in the field of pneumatic or non-pneumatic tyres, in particular in treads for which a good compromise between the performance in terms of reinforcement, breaking stress and rolling resistance rolling resistance is desired.

The invention claimed is:

1. A rubber composition based on at least:

an elastomer matrix comprising more than 50 phr of a copolymer containing ethylene units and 1,3-diene units, the ethylene units in the copolymer representing more than 50 mol % of monomer units of the copolymer;

a 1,3-dipolar compound corresponding to formula (I)

Q-Sp-B (I), in which Q comprises a dipole containing at least one nitrogen atom, Sp is an atom or a group of atoms connecting Q to B, and B comprises an imidazole ring corresponding to formula (II)

(II)

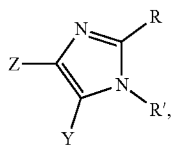

in which three of Z, Y, R and R', which are identical or different, each represent an atom or a group of atoms, it being possible for Z and Y to form, together with the carbon atoms to which they are attached, a ring, and the fourth of Z, Y, R or R' denotes a direct attachment to Sp;

a filler comprising predominantly silica; and a crosslinking system comprising at least one radical polymerization initiator and a co-crosslinking agent selected from the group consisting of (meth)acrylate compounds, maleimide compounds, allyl compounds, vinyl compounds and mixtures thereof;

wherein the copolymer containing ethylene units and 1,3-diene units is a copolymer of ethylene and of 1,3-diene, and wherein a content of co-crosslinking agent is within a range extending from 1 to 20 phr.

2. The rubber composition according to claim 1, wherein R' denotes a direct attachment to Sp, Z and Y are each a hydrogen atom, and R represents a hydrogen atom or a carbon-based group which can contain at least one heteroatom.

3. The rubber composition according to claim 1, wherein Sp is a group containing up to 20 carbon atoms and which can contain at least one heteroatom.

4. The rubber composition according to claim 1, wherein the 1,3-dipolar compound is selected from the group consisting of nitrile oxides, nitrile imines and nitrones.

5. The rubber composition according to claim 1, wherein Q comprises a unit corresponding to formula (V):

(V)

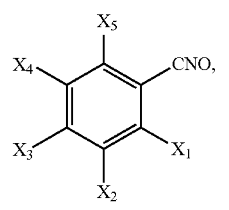

in which four of symbols $X_1$ to $X_5$, which are identical or different, are each an atom or a group of atoms, and the fifth symbol denotes a direct attachment to Sp, it being known that $X_1$ and $X_5$ are not hydrogen atoms.

6. The rubber composition according to claim 1, wherein the 1,3-dipolar compound is 2,4,6-trim ethyl-3-((2-methyl-1H-imidazol-1-yl)methyl)benzonitrile oxide or 2,4,6-tri ethyl-3-((2-methyl-1H-imidazol-1-yl)methyl)benzonitrile oxide.

7. The rubber composition according to claim 1, wherein a content of the 1,3-dipolar compound is between 0.1 and 3 molar equivalents of imidazole ring per 100 mol of monomer units constituting the copolymer.

8. The rubber composition according to claim 1, wherein the at least one radical polymerization initiator is an organic peroxide selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4'-di(tert-butylperoxy)valerate, 00-(t-butyl)O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and mixtures thereof.

9. The rubber composition according to claim 1, wherein a content of the at least one radical polymerization initiator is within a range extending from 0.1 to 3 phr.

10. The rubber composition according to claim 1, wherein the co-crosslinking agent comprises an acrylate derivative of formula (VIII):

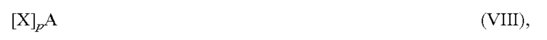

$[X]_pA$ (VIII), in which [X]p corresponds to a radical of formula (IX):

(IX)

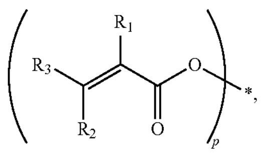

in which $R_1$, $R_2$ and $R_3$ independently represent a hydrogen atom or a $C_1$-$C_8$ hydrocarbon group selected from the group consisting of alkyl groups which are linear, branched or cyclic, alkylaryl groups, aryl groups and aralkyls, and which are optionally interrupted by one or more heteroatoms, it being possible for $R_2$ and $R_3$ together to form a non-aromatic ring, (*) represents a point of attachment of the radical of formula (IX) to A, A represents an atom belonging to the group consisting of alkaline earth metals or transition metals, a carbon atom or a $C_1$-$C_{30}$ hydrocarbon group, optionally interrupted and/or substituted by one or more heteroatoms, and A comprises p free valencies, p having a value ranging from 2 to 6, it being understood that X radicals are identical or different.

11. The rubber composition according to claim 10, wherein, in the acrylate derivative of formula (VIII), A represents an atom belonging to the group consisting of alkaline earth metals and transition metals, a carbon atom or a $C_1$-$C_{13}$ hydrocarbon group, and A comprises p free valencies, p having a value ranging from 2 to 4, it being understood that X radicals are identical or different.

12. The rubber composition according to claim 10, wherein $R_1$, $R_2$ and $R_3$ represent, independently of one another, a hydrogen atom, a methyl group or an ethyl group.

13. A pneumatic or non-pneumatic tire comprising a rubber composition according to claim 1.

14. The pneumatic or non-pneumatic tire according to claim 13, wherein the rubber composition is present in a tread of the tire.

* * * * *